(12) United States Patent
Ziemer (10) Patent No.: US 8,696,507 B2
(45) Date of Patent: Apr. 15, 2014

(54) HYBRID DRIVE TRAIN FOR A MOTOR VEHICLE

(71) Applicant: Peter Ziemer, Tettnang (DE)

(72) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 13/754,779

(22) Filed: Jan. 30, 2013

(65) Prior Publication Data

US 2013/0196808 A1    Aug. 1, 2013

(30) Foreign Application Priority Data

Jan. 31, 2012   (DE) .................... 10 2012 201 374

(51) Int. Cl.
  *F16H 3/72*    (2006.01)
  *F16H 37/06*   (2006.01)
  *B60K 6/20*    (2007.10)

(52) U.S. Cl.
  USPC ............. 475/5; 475/207; 475/209; 475/218; 475/219; 475/269; 180/65.21

(58) Field of Classification Search
  USPC .......... 180/65.21; 475/5, 207, 209, 218, 219, 475/269, 275, 302
  See application file for complete search history.

(56) References Cited

U.S. PATENT DOCUMENTS

| 5,106,352 | A | 4/1992 | Lepelletier |
| 8,177,671 | B2* | 5/2012 | Kawai et al. ...................... 475/5 |
| 2008/0196955 | A1* | 8/2008 | Minamikawa .............. 180/65.2 |
| 2009/0011887 | A1* | 1/2009 | Komada et al. .................. 475/5 |
| 2010/0000814 | A1* | 1/2010 | Katsuta et al. ........... 180/65.265 |
| 2010/0032218 | A1* | 2/2010 | Ideshio et al. .......... 180/65.225 |

FOREIGN PATENT DOCUMENTS

DE   10 2010 028 026   10/2011
EP   0 434 525 A1   6/1991

* cited by examiner

*Primary Examiner* — Derek D Knight
(74) *Attorney, Agent, or Firm* — Brinks Gilson & Lione (57) ABSTRACT

A transmission comprises an input shaft and an output shaft and two power paths between the input shaft and a main gear set. The transmission also comprises a first, second, third and fourth shafts, wherein at least one electric machine can be connected to one of the shafts of the main gear set, the first shaft can be connected via a first shifting element to a first power path and via a second shifting element to a second power path, the second shaft can be connected via a third shifting element to the first power path and via a fourth shifting element to the second power path, the third shaft is continuously connected to the output shaft, the fourth shaft can be fixed via a sixth shifting element and can be connected via a fifth shifting element to the first power path.

10 Claims, 5 Drawing Sheets

Fig. 2

| Gang | C | B | D | E | A | F | EM1+(EM2) | Transmission | Gear Jump |
|---|---|---|---|---|---|---|---|---|---|
| 1VM | o | | | | | o | M/Rek | 3.80 | 1.56 |
| 2VM | | o | | | | o | M/Rek | 2.44 | 1.47 |
| 3VM | | | o | | | o | M/Rek | 1.67 | 1.38 |
| 4VM | | o | o | | | | M/Rek | 1.21 | 1.21 |
| 5VM | | | o | | o | | M/Rek | 1.00 | 1.15 |
| 6VM | | o | | | o | | M/Rek | 0.87 | 1.16 |
| 7VM | | | | o | o | | M/Rek | 0.75 | 1.17 |
| 8VM | | o | | o | | | M/Rek | 0.64 | 1.11 |
| 9VM | o | | | o | | | M/Rek | 0.58 | |
| F/R Starting | | | | | | o | EM1 | 3.80 | |
| Motor-start | | o | | | | | EM1 | | |
| | | | | | | | EM1 | | |
| | | | | | | (o) | (EM2) | | |

Transmission-ratio stored : 6.6

Parking brake

| Gear | K0 | K1 | C | B | D | E | A | F | EM1, EM2 | Transmission | Gear Jump |
|---|---|---|---|---|---|---|---|---|---|---|---|
| 1V/E | o/- | o | o | | | | | o | M/Rek | 3.80 | 1.56 |
| 2V/E | o/- | o | | o | | | | o | M/Rek | 2.44 | 1.47 |
| 3V/E | o/- | o | | | o | | | o | M/Rek | 1.67 | 1.38 |
| 4V/E | o/- | o | | o | o | | | | M/Rek | 1.21 | 1.21 |
| 5V/E | o/- | o | | | o | o | | | M/Rek | 1.00 | 1.15 |
| 6V/E | o/- | o | | o | | o | | | M/Rek | 0.87 | 1.16 |
| 7V/E | o/- | o | o | | | o | | | M/Rek | 0.75 | 1.17 |
| 8V/E | o/- | o | o | | | | o | | M/Rek | 0.64 | 1.11 |
| 9V/E | o/- | o | | o | | | o | | M/Rek | 0.58 | |
| F/R Starting | | o | o | | | | | o | EM 1/2 | 3.80 | |
| Motor-start | o | o | o | | | | | | EM 1/2 | | |
| | o | o | | | | | | | EM 1/2 | | |
| | o | | | | | | | | EM1 | | |

Transmission-ratio stored: 6.6

Parking brake

Fig. 5

HYBRID DRIVE TRAIN FOR A MOTOR VEHICLE

PRIORITY STATEMENT

This application claims the benefit of Germany Patent Application No. DE 10 2012 201 374.1, filed Jan. 31, 2012, which is incorporated by reference herein in its entirety.

BACKGROUND

The invention relates to a transmission with a transmission input shaft and a transmission output shaft and two power transmission paths between the transmission input shaft and a main gear set consisting of two single planetary gear sets with four shafts identified in order of speed as first, second, third and fourth shaft, wherein the first of the power transmission paths exhibits a first fixed transmission ratio and the second of the power transmission paths exhibits a second fixed transmission ratio, wherein the second fixed transmission ratio is lower than the first fixed transmission ratio.

In addition the invention relates to a hybrid drive train for a motor vehicle comprising at least one internal combustion engine and at least one electric machine.

A transmission of the initially named type is known, for example, from EP 0 434 525 A1. In the known transmission which exhibits five shifting elements, whose selective pair by pair engagement causes different transmission ratios between the transmission input shaft and the transmission output shaft, six forward gears and one reverse gear are implemented.

Furthermore, a hybrid drive train with an internal combustion engine and a plurality of electric motors is known from patent application DE 10 2010 028 026 of the applicant for this patent. In this hybrid drive train a gear transmission with partial transmissions is used, each of said partial transmissions exhibiting a shiftable gear stage. The shiftable gear stages present in the partial transmissions are provided by a direct gear with coaxial input and output, each of which being generated by precisely one single transmission, such as a spur gear pair or a planetary transmission. A nine-gear countershaft transmission with coaxial output would accordingly require at least nine single transmissions for the nine gears in the form of nine spur gear pairs.

Therefore, one of the problems addressed by the invention is the problem of reducing the required design and construction costs for a hybrid drive train of the type mentioned above with a multiple speed transmission.

This problem is solved according to the invention with a transmission of the initially named type by connecting at least one electric machine to one of the shafts of the main gear set, wherein the first shaft can be connected via a first shifting element to a first power transmission path and via a second shifting element to a second power transmission path, wherein the second shaft can be connected via a third shifting element to the first power transmission path and via a fourth shifting element to the second power transmission path, wherein the third shaft is continuously connected to the transmission output shaft, wherein the fourth shaft can be fixed via a sixth shifting element and can be connected via a fifth shifting element to the first power transmission path or the second power transmission path.

SUMMARY

The inventive solution is characterized above all by an essentially reduced and simplified design, as a result of which an optimization with respect to the total weight and the required installation space can be achieved. Every two shifting elements can be actuated in turns by means of a double-acting actuator. In this connection a closing of a first shifting element can result in an opening of a second shifting element. All the shifting elements named in this document can be embodied as positive locking shifting elements, for example, as jaw clutch elements, in particular dog clutches or claw brakes. A further advantage of the inventive transmission consists in the fact that the used shifting elements do not require a synchronization device, since a synchronization of the shifting elements can take place via the electric machine and an internal combustion engine in a no-load state. In addition the electric machine can serve as a rotational speed transmitter (resolver). In this connection undefined speed of rotation states on the planetary gear sets within and outside of the shifting of the gears by means of continually defined speeds on the electric machine can be prevented on the input and output. In addition, a load shift can also take place in the case of combustion engine driving via the electric machine.

The used planetary transmissions are embodied as minus planetary gear sets. A simple minus planetary gear set comprises a sun gear, an internal gear and a web, at which planetary gears are pivoted, each of which meshes with the sun gear and the internal gear. As a result of this the internal gear in the case of the fastened web exhibits a direction of rotation opposite to the sun gear. By way of contrast a simple plus-planetary gear set comprises a sun gear, an internal gear and a web, at which the internal and external planetary gears are pivoted, wherein all internal planetary gears mesh with the sun gear and all external planetary gears mesh with the internal gear, wherein each inner planetary gear meshes with an internal planetary gear. As a result of this, in the event of a fastened web the internal gear exhibits the same direction of rotation as the sun gear. In accordance with the invention a minus planetary gear set can however also be replaced by a plus planetary gear set if simultaneously the web and internal gear connection is replaced and the amount of stationary transmission ratio of the planetary gear set is increased by 1 in comparison to the design as a minus planetary gear set.

One particularly advantageous variant of the invention, in which case a starting, moving, reversing, boosting, recuperation as well as load shifting takes place via the electric machine, provides that the electric machine is continuously connected or can be switched on and off, is directly connected or connected via a transmission to the first shaft of the main gear set. An additional advantage can be seen in the fact that no separate reverse gear is required.

One example embodiment of the invention, which manages with a low number of required shifting elements and avoids double shifting in the case of sequential shifting, provides that ten forward gears are realized by selective pair by pair engagement of the six shifting elements, wherein nine of the ten forward gears can be shifted under load and can be shifted without range shifting, wherein the first forward gear arises by closing the sixth shifting element and the first shifting element, the second forward gear arises by closing the sixth shifting element and the second shifting element, the third forward gear arises by closing the sixth shifting element and the third shifting element, the fourth forward gear arises by closing the third shifting element and the second shifting element, the ninth forward gear arises by closing the first shifting element and the fourth shifting element and a further gear arises by closing the sixth shifting element and of the fourth shifting element, wherein in the case that the fourth shaft can be connected to the first power transmission path via the fifth shifting element, the fifth forward gear arises by closing the third shifting element and the fifth shifting element or by closing the fifth shifting element and the first shifting element or by closing the first shifting element and the third shifting element, the sixth forward gear arises by closing the second shifting element and the fifth shifting element, the seventh forward gear arises by closing the fourth shifting element and the fifth shifting element, the eighth forward gear arises by closing the second shifting element and the fourth shifting element, wherein in the case that the fourth shaft can be connected to the second power transmission path via the fifth shifting element, the fifth forward gear arises by closing the first shifting element and the third shifting element, the sixth forward gear arises by closing the fifth shifting element and the third shifting element, the seventh forward gear arises by closing the fifth shifting element and the first shifting element and the eighth forward gear arises by closing the fifth shifting element and the fourth shifting element or by closing the second shifting element and the fourth shifting element or by closing the second shifting element and the fifth shifting element.

One example embodiment provides that the transmission output shaft is arranged coaxially to the transmission input shaft, wherein the second power transmission path comprises an overdrive planetary gear set for emission of a greater speed of rotation than the transmission input, wherein a first shaft of the overdrive planetary gear set is fixed and a second shaft of the overdrive planetary gear set can be connected to the transmission input shaft continuously or via a seventh shifting element and the second shifting element and the fourth shifting element are connected at a third shaft of the overdrive planetary gear set, wherein the first power transmission path is a direct drive.

The overdrive planetary gear set is embodied as a minus gear set with a sun gear, a web and an internal gear, wherein the sun gear is fixed, the web can be detachably connected to the transmission input shaft continuously or via the seventh shifting element and the second shifting element and the fourth shifting element are connected to the internal gear.

Corresponding to an example embodiment, which is characterized by low torques present in the shifting elements and in the planetary gear sets, the first shaft of the main gear set is connected to a sun gear of the first single planetary gear set of the main gear set, wherein the second shaft of the main gear set is connected to an internal gear of the second single planetary gear set of the main gear set, the third shaft of the main gear set is connected to a web of the first single planetary gear set and a web of the second single planetary gear set of the main gear set and the fourth shaft of the main gear set is connected to a sun gear of the second single planetary gear set and an internal gear of the first single planetary gear set of the main gear set. This variant of the invention makes a space saving dimensioning possible due to the low torques present in the shifting elements and the planetary gear sets.

In order to make do with the lowest possible axial installation space, provision can be made that the two single gear sets of the main gear set are arranged radially nested on top of one another, wherein a sun gear of the second single gear set and the internal gear of the first single gear set are embodied as a single element.

The above named problem can also be solved with a hybrid drive train of the type initially mentioned by having said hybrid drive train exhibit a transmission according to example embodiments of the application.

In accordance with a further example embodiment of the invention at least a second electric machine directly connected to the internal combustion engine or connected via a transmission or detachably connected via at least an eighth shifting element can be provided in the form of a starter or start generator. In the case of this variant of the invention the advantage arises that by opening the eighth shifting element a purely electrical drive operation allowing shifting under load is made possible in all gears. Additional advantages connected to this example embodiment consist in the fact that a battery size-independent system arises, since a combustion engine-electrical driving is possible. Also a generator operation for braking of the internal combustion engine in particular during upshifting from the first to the second or from the second to the third gear is possible.

An especially simple and space-saving construction arises from the fact that the first shifting element and the second shifting element and/or the third shifting element and the fourth shifting element and/or the fifth shifting element and the sixth shifting element and/or the seventh shifting element and the eighth shifting element can be actuated by a double-acting actuator.

BRIEF DESCRIPTION OF THE DRAWINGS

The invention along with additional advantages will be described more closely in the following with the assistance of some non-restricting example embodiments which are shown in the drawings. The drawings show the following schematically.

DETAILED DESCRIPTION OF EXAMPLE EMBODIMENTS

By way of introduction it is stated that in the different described example embodiments the same parts are provided with the same reference numerals or the same component names, wherein the disclosures contained in the entire description correspondingly can be transferred to the same parts with the same reference numerals or the same component names.

Figure 1:
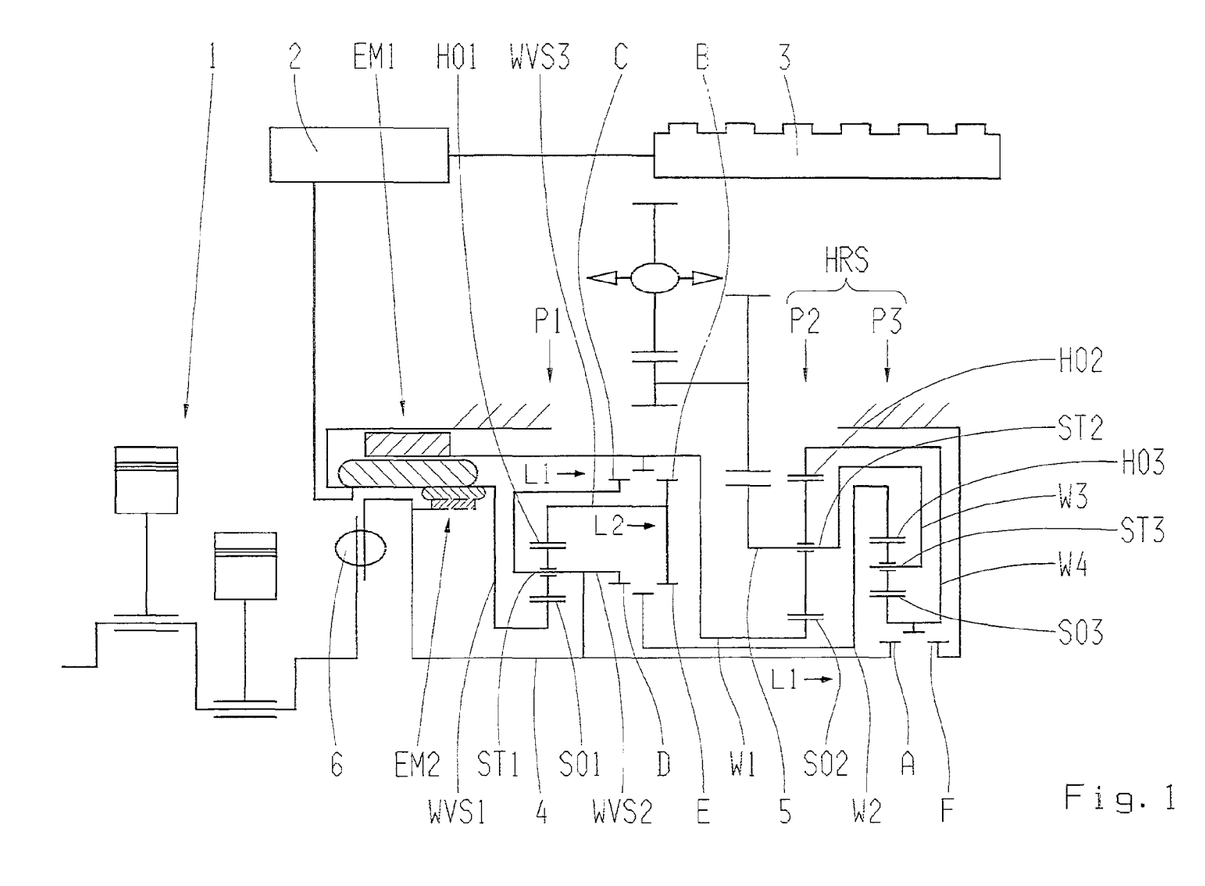
FIG. 1 shows a transmission schematic of a first example embodiment of an inventive hybrid drive train with an inventive transmission.

In accordance with FIG. 1 an inventive hybrid drive train for a motor vehicle exhibits an internal combustion engine 1 and at least one electric machine EM1. In addition, a control system 2 can be provided for the electric machine EM1 and an electric energy storage 3.

The hybrid drive train exhibits an inventive transmission with a transmission input shaft 4 and a transmission output shaft 5. For vibration damping a torsional vibration damper 6 can be provided between the internal combustion engine 1 and the transmission. In addition, a second electric motor EM2 can be provided, for example, in the form of a starter or start generator. An axis differential and/or distributor differential can be arranged on the output side.

Figure 2:
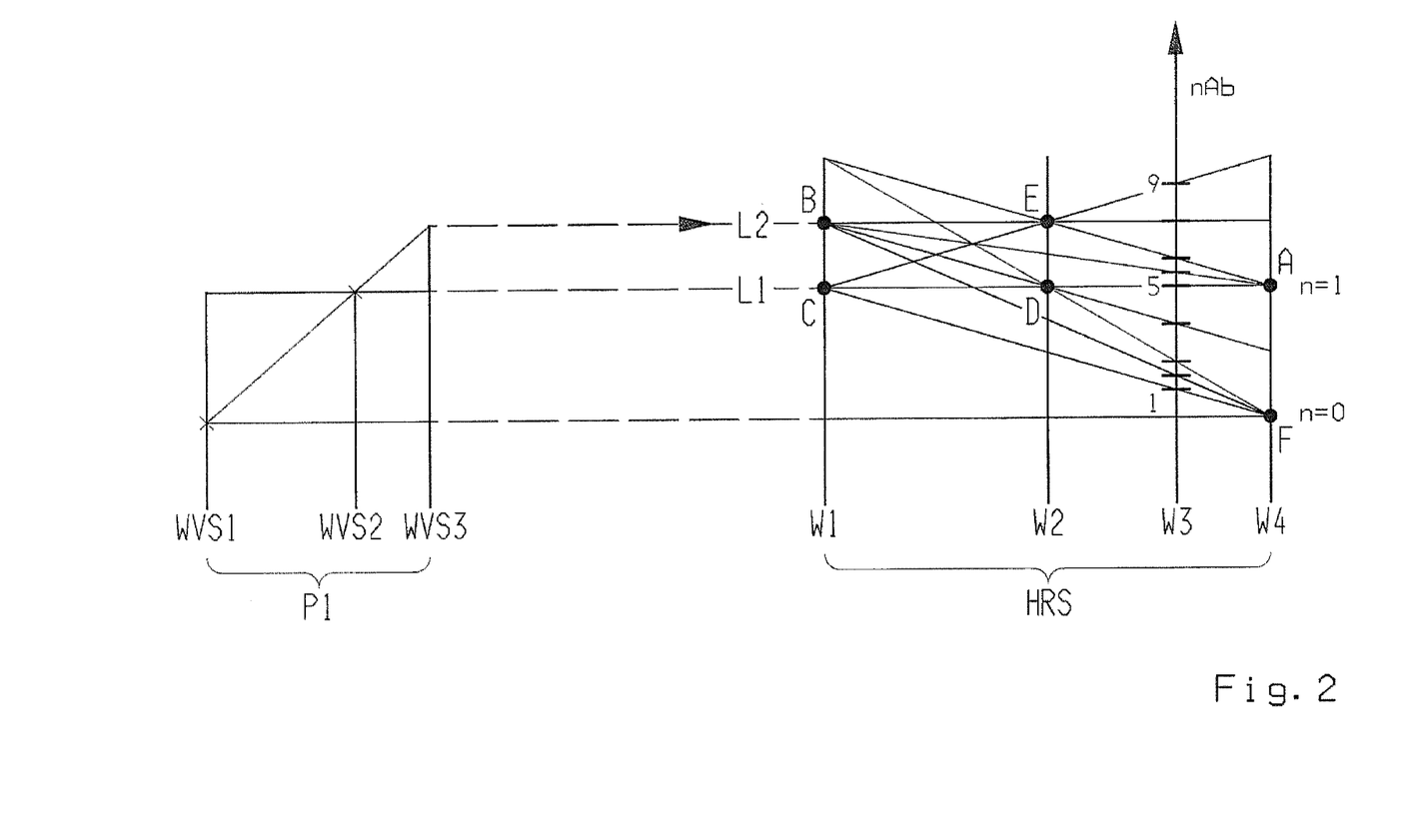
FIG. 2 shows a speed of rotation diagram of an inventive transmission.

As can be seen from FIGS. 1 and 2, two power transmission paths L1 and L2 are realized between the transmission input shaft 4 and a main gear set HRS consisting of two single planetary gear sets P2, P3. The two power transmission paths L1 and L2 represent two different transmission paths for the rotational speeds emitted by the transmission input shaft 4.

The first power transmission path L1 exhibits a first fixed transmission ratio i1 and the second power transmission path L2 exhibits a second fixed transmission ratio i2, wherein the second fixed transmission ratio i2 is lower than the first fixed transmission ratio i1.

The main gear set HSR exhibits four rotatable shafts in their order of speed, i.e., according to their sequence in a revolution speed map W1, W2, W3, W4 as the first, second, third, and fourth shaft. The first shaft W1 can be connected to the first power transmission path L1 via a first shifting element C and can be connected to a second power transmission path L2 via a second shifting element B. The second shaft W2 can be connected to the first power transmission path L1 via a third shifting element D and can be connected to the second power transmission path L2 via a second shifting element B. The third shaft W3 is continuously connected to the transmission output shaft 5. It is mentioned here that in the present text the terms "continuously" and "fixed" or "torque-proof" are used interchangeably. The fourth shaft W4 can be fixed via a sixth shifting element F and connected via a fifth shifting element A, as shown in FIG. 1, to the first power transmission path L1.

The first shaft W1 of the main gear set HRS can be connected to a sun gear SO2 of the first single planetary gear set P2 of the main gear set HRS, wherein the second shaft W2 of the main gear set HRS is connected to an internal gear H03 of the second single planetary gear set P3 of the main gear set HRS. The third shaft W3 of the main gear set HRS can be connected to a web ST2 of the first single planetary gear set P2 and a web ST3 of the second planetary gear set P3 of the main gear set HRS, while the fourth shaft W4 of the main gear set HRS is connected to an internal gear SO3 of the second single planetary gear set P2 and an internal gear HO2 of the first single planetary gear set P2 of the main gear set HRS.

The two single gear sets P2, P3 of the main planetary gear set HRS can be arranged radially nested on top of one another, wherein a sun gear SO3 of the second single gear set P3 and the internal gear HO2 of the first single gear set P2 are embodied as a single element. This design is suitable in particular for a motor vehicle with front-transverse drive (front drive with a drive motor arranged transverse to the longitudinal axis of the vehicle).

The main gear set HSR formed from the planetary transmissions P2 and P3 could also be executed in Ravigneaux design. In this connection the shifting elements B and C would be provided as a connection to the sun gear SO2 of the first planetary transmission P2 of the main gear set HRS as well as the shifting elements A and F being provided as a connection to the sun gear SO3 of the second planetary transmission P3 of the main gear set HSR as well as shifting elements D and E being provided as a connection to the common web ST2, ST3 as well as the output being provided as a connection.

The main gear set HSR could also be realized in Simpson design. In this connection however a construction with a divided sun gear and a long planetary gear would be of advantage, in order to be able to connect the shifting elements E and D to the web ST2 which does not contain any addition coupling. The shifting elements B and C could be connected to the (divided) sun gear and shifting elements A and F to the internal gear HO3 which does not contain any additional coupling. Output would take place via the web ST3 coupled to the internal gear HO2.

The electric machine EM1 can be continuously connected to the first shaft W1 of the main gear set HRS. As an alternative to a continuous connection the electric machine EM1 can however also be connectable and disconnectable, directly or via a transmission, in particular a belt, chain, spur gear or planetary transmission to the first shaft W1. In principle the electric machine EM1 can also be reversibly connected between the second shaft W2 and the fourth shaft W4. It would also be possible to connect the electric machine EM1 only to the second shaft W2 and additionally connect a further electric machine to the fourth shaft W4 to guarantee it will shift under load.

The transmission output shaft 5 is arranged coaxially to the transmission input shaft 4, wherein the second power transmission path L2 can comprise a front mounted gear set in the form of an overdrive planetary gear set P1 for emitting a greater speed of rotation than the transmission input shaft 4.

Figure 4:
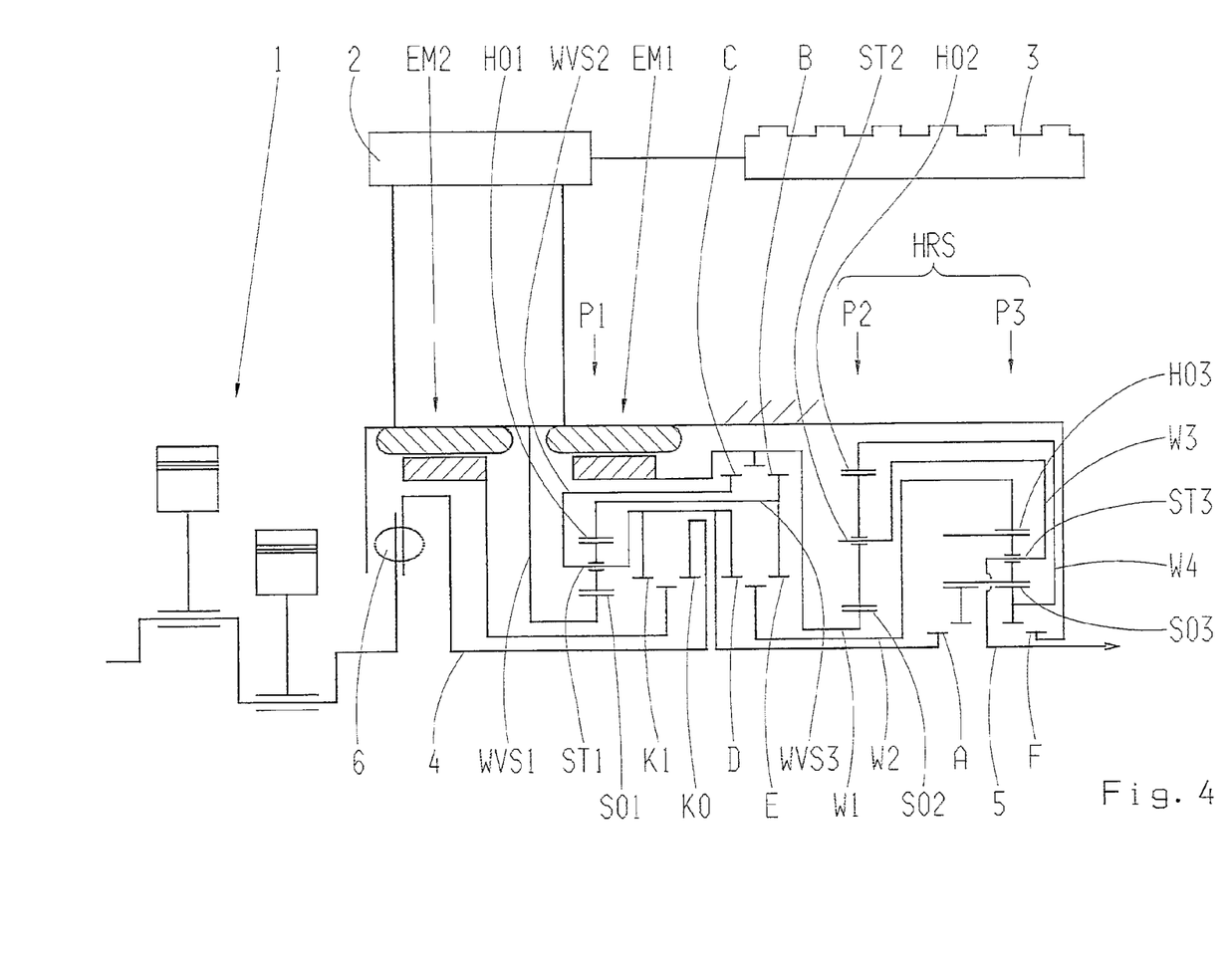
FIG. 4 shows a transmission schematic of a second example embodiment of an inventive hybrid drive train with an inventive transmission.

A first shaft WVS1 of the overdrive planetary gear set P1 is in this connection fixed and a second shaft WVS2 of the overdrive planetary gear set P1 can, as shown in FIG. 1, be continuously connected to the transmission input shaft 4 or, as shown in FIG. 4, be connected to the transmission input shaft 4 via a seventh shifting element K1.

The second shifting element B and the fourth shifting element E are connected to a third shaft WVS3 of the overdrive planetary gear set P1, wherein the first power transmission path L1 is a direct drive.

In accordance with the example embodiment the overdrive planetary gear set P1 can be embodied as a minus gear set with a sun gear SO1, a web ST1 and an internal gear HO1. The sun gear SO1 is fixed, while the web ST1 can be continuously connected to the transmission input shaft 4 or detachably connected via the seventh shifting element K1. The second shifting element B and the fourth shifting element E are connected to the internal gear HO1.

Here reference is also made to the fact that the first power transmission path L1 can also be embodied as an underdrive planetary gear set P1 for emission of a speed of rotation lower than the speed of rotation of the transmission input 4. In this case the first shaft WVS1 can be fixed. In this connection the first shifting element C and the second shifting element D can be connected to the second shaft WVS2, while the third shaft is continuously connected or connected via shifting element K1 to the transmission input shaft 4. The second power transmission path L2 is in this case embodied as a direct drive. If in this connection, for example, the fifth shifting element A is connected on the second power transmission path L2, thus on the drive, in the case of an underdrive planetary gear set P1 embodied as a plus gear set, the sun gear SO1 would be fixed and the first shifting element C and the third shifting element D would be connected on the internal gear HO1, wherein the web ST1 can be continuously connected to the transmission input shaft or detachably connected to it via a shifting element K1. For the purpose of establishing the ability to be connected, it can be necessary to design the internal gear HO1 divided. For example, this would be necessary if the first power transmission path L1 is embodied as an underdrive planetary gear set P1 and simultaneously the fifth shifting element A is connected on the first power transmission path L1.

Ten forward gears are realized by selective pair by pair engagement of the six shifting elements A, B, C, D, E, F of the transmission, wherein nine of the ten forward gears can be shifted under load and can be shifted without range shifting. By the term "can be shifted without range shifting" in the present context it is understood that in the event of a shifting to the next higher gear or the next lower gear only one shifting element is opened and another shifting element is closed.

From the speed diagram or revolution speed map shown in FIG. 2 the relationships can be seen between the gears achieved through selective engagement of shifting elements A, B, C, D, E, F, and the transmission ratio of each shaft W1, W2, W3, W4. The speed ratios are applied in vertical direction to the individual shafts W1, W2, W3, W4. The horizontal distance between the shafts arises from the transmissions, so that speed ratios belonging to a specified operating point can be connected by a straight line. In the case of a specified drive rotational speed the nine operating lines of the main gear set HRS characterize the speed ratios in nine forward gears.

Figure 3:
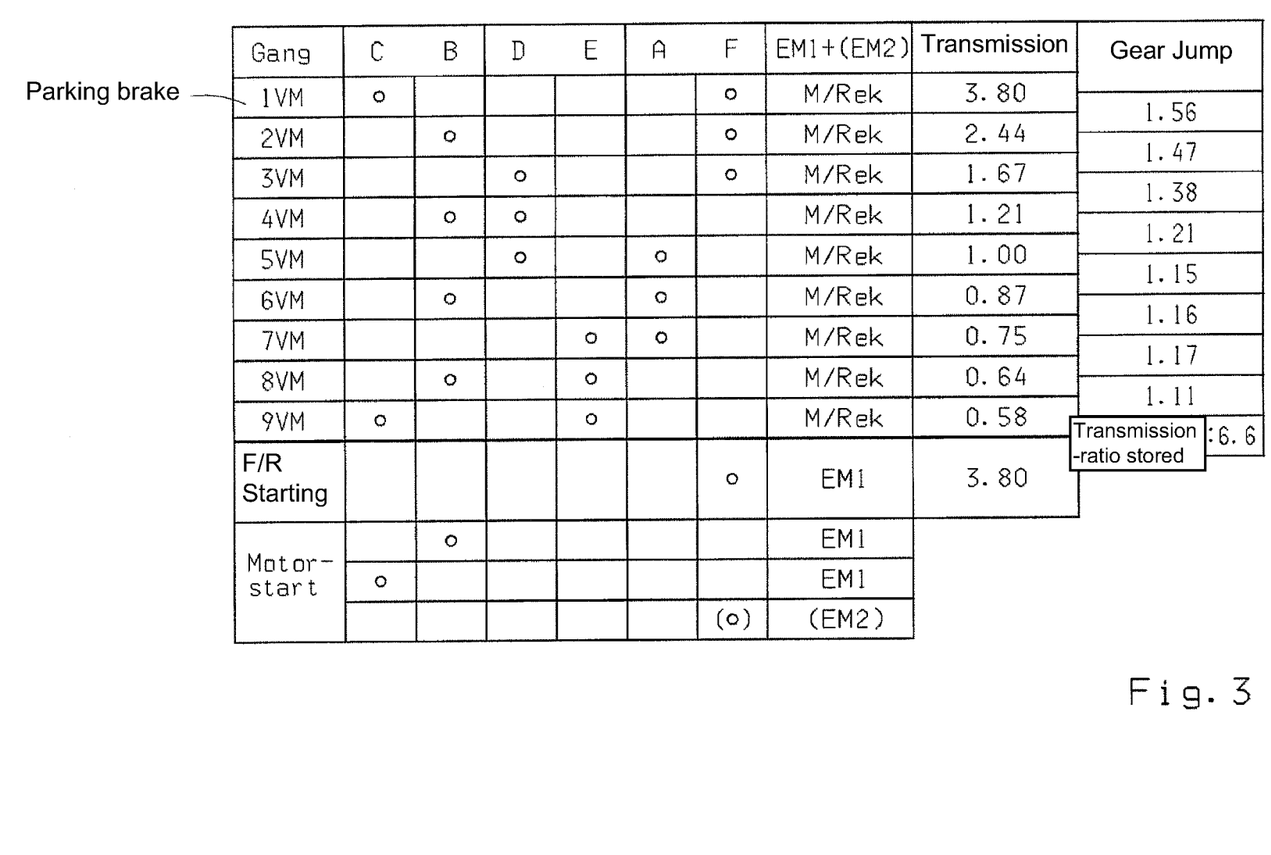
FIG. 3 shows a gear shift pattern for the transmission shown in FIGS. 1 and 2.

FIG. 3 shows an exemplary gear shift pattern for the multiple speed transmission shown in FIG. 1. For each gear two shifting elements are closed. The respective transmissions of the individual gear stages and the gear speed increments to the next higher gear to be determined from them can be inferred by way of example from the gear shift pattern, wherein the transmission exhibits a spread of 6.6. FIG. 3 shows that in the case of sequential shifting, double shifting or range shifting can be avoided, since two adjacent gear stages jointly use one shifting element. Typical values for the stationary transmission ratios of the planetary transmissions P1, P2 and P3 executed in the present case as minus planetary gear sets are −1.8 for P1, −2.8 for P2, −1.5 for P3.

A first forward gear arises by closing the sixth shifting element F and the first shifting element C, the second forward gear arises by closing the sixth shifting element F and the second shifting element B, the third forward gear arises by closing the sixth shifting element F and the third shifting element D, the fourth forward gear arises by closing the third shifting element D and the second shifting element B.

For the case that the fourth shaft W4 can be connected via the fifth shifting element A to the first power transmission path L1, the fifth forward gear arises by closing the third shifting element D and the fifth shifting element A or by closing the fifth shifting element A and the first shifting element C or by closing the first shifting element C and the third shifting element D, the sixth forward gear arises by closing the second shifting element B and the fifth shifting element A, the seventh forward gear arises by closing the fourth shifting element E and the fifth shifting element A, the eighth forward gear arises by closing the second shifting element B and the fourth shifting element E.

For the case that the fourth shaft W4 can be connected via the fifth shifting element A to the second power transmission path L1, the fifth forward gear arises by closing the first shifting element C and the third shifting element D, the sixth forward gear arises by closing the fifth shifting element A and the third shifting element D, the seventh forward gear arises by closing the fifth shifting element A and the first shifting element C and the eighth forward gear arises by closing the fifth shifting element A and the fourth shifting element E or by closing the second shifting element B and the fourth shifting element E or by closing the second shifting element B and the fifth shifting element A.

The ninth forward gear arises in all of the above cited cases by closing the first shifting element C and the fourth shifting element E and a further gear arises by closing the sixth shifting element F and the fourth shifting element E.

As can be inferred from FIG. 4, the second electric machine EM2 in the form of a starter or start generator can be connected to the internal combustion engine 1 via an eighth shifting element K0. As an alternative to this, the second electric machine EM2 can be continuously connected to the internal combustion engine 1.

Figure 5:
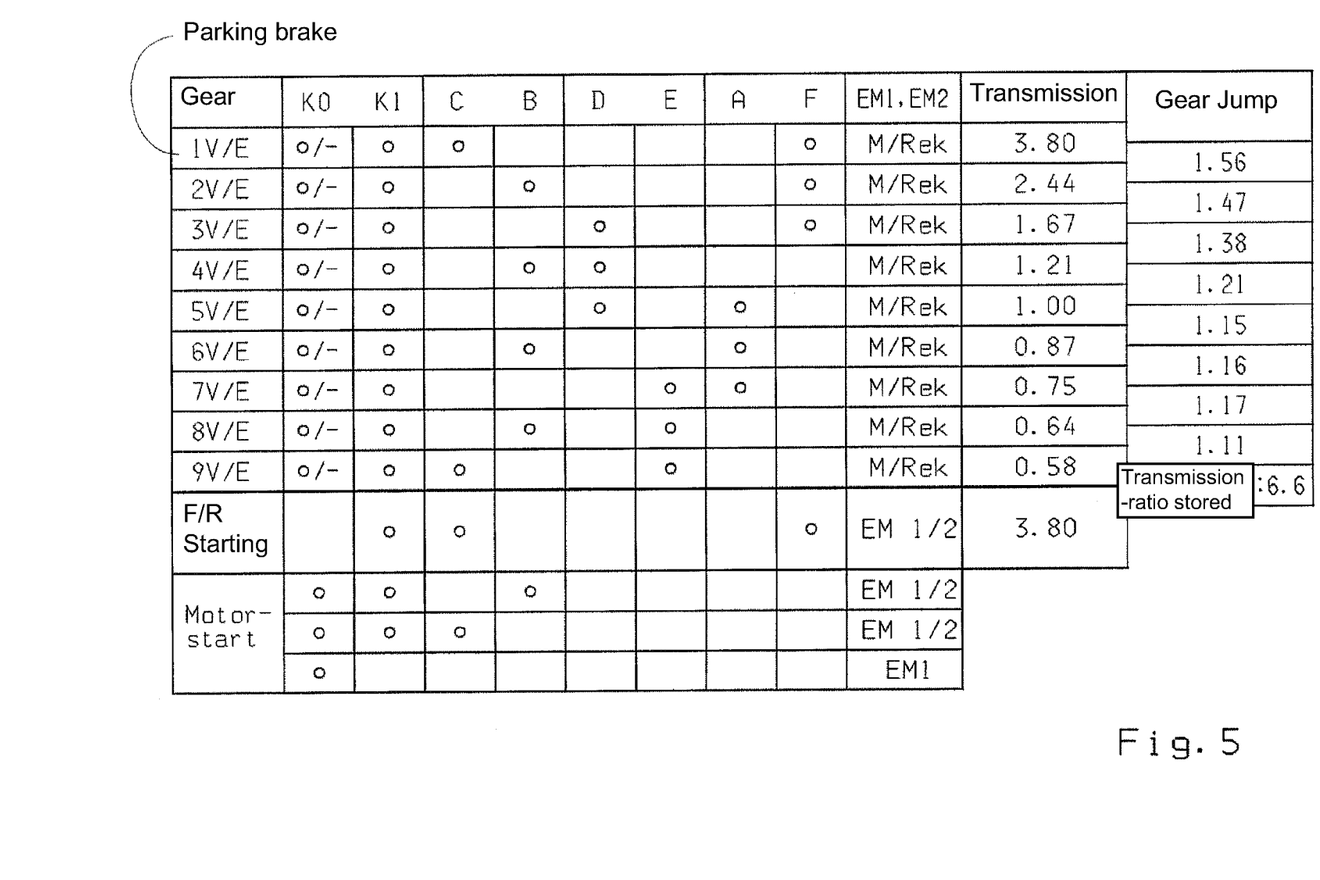
FIG. 5 shows a gear shift pattern for the hybrid drive train shown in FIG. 4.

FIG. 5 presents an exemplary gear shift pattern for the hybrid drive train shown in FIG. 4. For each gear that can be shifted under load in electric drive operation three shifting elements are closed, while the shifting element K0 is opened. In the case of a closed shifting element K0 and an opened shifting element K1 a combustion engine-electric drive operation arises. From the gear shift pattern it is possible to infer the respective transmissions of the individual gear stages and the gear speed increments to the next higher gear to be determined from them, wherein the transmission exhibits a spread of 6.6. From FIG. 5 it can likewise be seen that in the case of sequential shifting, double shifting or range shifting can be avoided, since two adjacent gear stages jointly use one shifting element.

It is also pointed out here that in the case of all the described example embodiments of the invention the shifting elements A, B, C, D, E as well as the shifting elements K0, K1 are designed as dog clutches while the shifting element F is embodied as a claw brake. Also in the case of all example embodiments of the invention the first shifting element C and the second shifting element B and/or the third shifting element D and the fourth shifting element E and/or the fifth shifting element A and the sixth shifting element F and/or the seventh shifting element K1 and the eighth shifting element K0 can each be actuated by a double-acting actuator. Hence a pair of shifting elements can be actuated by a single actuator. As a result of this the design can be simplified as well as reducing the required installation space and production costs.

A purely electric drive operation arises by closing the sixth shifting element F and opening the first, second, third, fourth and fifth shifting elements A, B, C, D, E.

As can be inferred in the gear shift pattern shown in FIGS. 3 and 5, the load shift takes place in the case of combustion engine driving via the electric machine EM1. In the case of a closed shifting element F (shifting operations from first to second and from second to third gear) or of a closed shifting element A (for example in the case of shifting from sixth to seventh gear) in electromotive operation and in the case of a closed shifting element D (shifting operations from third to fourth and from fourth to fifth gear) or E (for example in the case of shifting from eighth to ninth gear) in generator operation, the internal combustion engine 1 continues to be under load with the exception of the case of the closed shifting element F.

An additional shifting of the internal combustion engine 1 is also possible during the purely electric drive operation—with closed shifting element F, which is designed as a claw brake—without interruption of tractive power. The internal combustion engine 1 can, after prior synchronization to the gears one through three as well as in the gear, which arises by closing the sixth shifting element F and the second shifting element E, be shifted additionally without interruption of tractive power.

To start the internal combustion engine 1 during the purely electric drive operation the shifting element F can be disengaged and preferably, in order to exploit the transmission of the first planetary transmission P1 representing a first front mounted gear set, the shifting element B or the shifting element C can be closed after prior synchronization. Then the internal combustion engine 1 can be started via the electric machine. Subsequently, after prior synchronization the claw brake F can be closed again and it is possible to continue driving in first (C and F closed) or second gear (B and F closed) with an internal combustion engine. Of course it is also possible to continue driving with the internal combustion engine in all other gears, including also in the gear not listed in the gear shift logic (E and F closed) after corresponding synchronization.

As can further be seen from FIGS. 3 and 5, a purely electrical driving in first gear is likewise possible (forward/reverse drive). Depending on the overall transmission ratio and rotational speed limit of the electric machine, speeds significantly above 60 km/h can be achieved.

In the case of the inventive hybrid drive train a parking lock can also easily be integrated. For example, during parking the first gear can be engaged. The parking lock can also be achieved by having the electric machine generate torque against a grade resistance and the shifting element C can be disengaged without load in order to be able to then start up electrically.

The exemplary embodiments show possible variants of the inventive transmission or hybrid drive train, wherein it is noted here that the invention is not restricted to the special design variants shown. In addition, diverse combinations of the individual design variants with one another are possible, wherein these variation possibilities due to the teaching on the technical behavior of the present invention lie within the ability of a person skilled in the art that is active in this technical field.

REFERENCE NUMERALS

| | |
|---|---|
| 1 | Internal combustion engine |
| 2 | Control system |
| 3 | Electrical Energy storage |
| 4 | Transmission input shaft |
| 5 | Transmission output shaft |
| 6 | Torsion element |
| EM1 | First electric machine |
| EM2 | Second electric machine |
| P1 | First planetary transmission |
| P2 | Second planetary transmission |
| P3 | Third planetary transmission |
| HRS | Main gear set |
| W1 | First shaft main gear set |
| W2 | Second shaft main gear set |
| W3 | Third shaft main gear set |
| W4 | Fourth shaft main gear set |
| WVS1 | First shaft front mounted gear set |
| WVS2 | Second shaft front mounted gear set |
| WVS3 | Third shaft front mounted gear set |
| C | First shifting element |
| B | Second shifting element |
| D | Third shifting element |
| E | Fourth shifting element |
| A | Fifth shifting element |
| F | Sixth shifting element |
| K1 | Seventh shifting element |
| K0 | Eighth shifting element |
| SO1 | Sun gear of the first planetary transmission |
| ST1 | Web of the first planetary transmission |
| HO1 | Internal gear of the first planetary transmission |
| SO2 | Sun gear of the second planetary transmission |
| ST2 | Web of the second planetary transmission |
| HO2 | Internal gear of the second planetary transmission |
| SO3 | Sun gear of the third planetary transmission |
| ST3 | Web of the third planetary transmission |
| HO3 | Internal gear of the third planetary transmission |

I claim:

1. A transmission, comprising:
a transmission input shaft;
a transmission output shaft;
a main gear set;
a main gear set comprising a first planetary gear set an a second planetary gear set and, in order of speed, a first shaft, a second shaft, a third shaft, and a fourth shaft;
a first power transmission path between the transmission input shaft and the main gear set, comprising a first fixed transmission ratio; and
a second power transmission path between the transmission input shaft and the main gear set, comprising a second fixed transmission ratio lower than the first fixed transmission ratio;
wherein at least one of the first shaft, the second shaft, the third shaft and the fourth shaft is capable of being connected to an electric machine,
wherein the first shaft is capable of being connected via a first shifting element to the first power transmission path and via a second shifting element to the second power transmission path,
wherein the second shaft is capable of being connected via a third shifting element to the first power transmission path and via a fourth shifting element to the second power transmission path,
wherein the third shaft is continuously connected to the transmission output shaft,
wherein the fourth shaft is capable of being fixed via a sixth shifting element and is capable of being connected via a fifth shifting element to the first power transmission path or the second power transmission path.

2. The transmission according to claim 1, wherein the connection between the electric machine and the first shaft is at least one of a continuous connection, a connection capable of being switched on and off, a direct connection, and a connection via a transmission.

3. The transmission according to claim 1, wherein ten forward gears are realized each by selectively engaging a pair of the first, second, third, fourth, fifth, and sixth shifting elements,
wherein nine of the ten forward gears is capable of being shifted under load and without range shifting,
wherein
the first forward gear arises by closing the sixth shifting element and the first shifting element,
the second forward gear arises by closing the sixth shifting element and the second shifting element,
the third forward gear arises by closing the sixth shifting element and the third shifting element,
the fourth forward gear arises by closing the third shifting element and the second shifting element,
the ninth forward gear arises by closing the first shifting element and the fourth shifting element and a further gear arises by closing the sixth shifting element and the fourth shifting element,
when the fourth shaft is capable of being connected to the first power transmission path via the fifth shifting element,
the fifth forward gear arises by closing the third shifting element and the fifth shifting element or by closing the fifth shifting element and the first shifting element or by closing the first shifting element and the third shifting element,
the sixth forward gear arises by closing the second shifting element and the fifth shifting element,
the seventh forward gear arises by closing the fourth shifting element and the fifth shifting element,
the eighth forward gear arises by closing the second shifting element and the fourth shifting element, and
when the fourth shaft is capable of being connected to the second power transmission path via the fifth shifting element,
the fifth forward gear arises by closing the first shifting element and the third shifting element,
the sixth forward gear arises by closing the fifth shifting element and the third shifting element, the seventh forward gear arises by closing the fifth shifting element and the first shifting element and the eighth forward gear arises by closing the fifth shifting element and the fourth shifting element or by closing the second shifting element and the fourth shifting element or by closing the second shifting element and the fifth shifting element.

4. The transmission according to claim 1, wherein the transmission output shaft is arranged coaxially to the transmission input shaft,
  wherein the second power transmission path comprises an overdrive planetary gear set for emission of a greater speed of rotation than the transmission input,
  wherein a first shaft of the overdrive planetary gear set is fixed and a second shaft of the overdrive planetary gear set is capable of being connected to the transmission input shaft continuously or via a seventh shifting element and the second shifting element and the fourth shifting element are connected at a third shaft of the overdrive planetary gear set,
  wherein the first power transmission path is a direct drive.

5. The transmission according to claim 4, wherein the overdrive planetary gear set is a minus gear set comprising:
  a sun gear;
  a web; and
  an internal gear,
  wherein the sun gear is fixed, the web is capable of being detachably connected to the transmission input shaft continuously or via the seventh shifting element and the second shifting element and the fourth shifting element are connected to the internal gear.

6. The transmission according to claim 1, wherein the first shaft of the main gear set is connected to a sun gear of the first planetary gear set of the main gear set,
  the second shaft of the main gear set is connected to an internal gear of the second planetary gear set of the main gear set,
  the third shaft of the main gear set is connected to a web of the first planetary gear set and a web of the second planetary gear set of the main gear set, and
  the fourth shaft of the main gear set is connected to a sun gear of the second planetary gear set and an internal gear of the first single planetary gear set of the main gear set.

7. The transmission according to claim 6, wherein the first and second gear sets of the main gear set are arranged radially nested on top of one another,
  wherein a sun gear of the second gear set and the internal gear of the first gear set are embodied as a single element.

8. A hybrid drive train for a motor vehicle comprising:
  an internal combustion engine;
  an electric machine; and
  a transmission according to claim 1.

9. The hybrid drive train according to claim 8, further comprising a second electric machine, wherein the second electric machine is connected to the internal combustion engine directly or via a transmission or detachably via an eighth shifting element, and wherein the second electric machine is in the form of a starter or start generator.

10. The hybrid drive train according to claim 8, wherein at least one pair of shifting elements are capable of being actuated by a double-acting actuator, the at least one pair of shifting elements is at least one of
  the first shifting element and the second shifting element,
  the third shifting element and the fourth shifting element,
  the fifth shifting element and the sixth shifting element, and
  the seventh shifting element (K1) and the eighth shifting element.

* * * * *